2,912,337
Patented Nov. 10, 1959

2,912,337

METHOD OF PROCESSING CANNED MEAT PRODUCTS

Richard A. Greenberg, Chicago, Ill., assignor to Swift & Company, Chicago, Ill., a corporation of Illinois No Drawing. Application February 14, 1957
Serial No. 640,091

7 Claims. (Cl. 99—187)

This invention relates in general to the preservation of food products, and more particularly to a method of canning food products in which rigorous heat processing can detract substantially from the organoleptic properties of the canned product.

In the conventional canning of foods, the product is confined in a can or other container, which is sealed and then subjected to a processing operation. Processing involves heating the product in hot or boiling water, or exposing the canned product to steam under pressure for a predetermined time. The primary purpose of processing is the destruction of pathogenic and spoilage bacteria. Certain bacteria of the family Bacillaceae exist in both a heat sensitive form (vegetative state) and a very resistant form (spore state). Vegetative cells, as well as all non-sporing forms of microorganisms, are easily destroyed by low heat processing, i.e., pasteurization. Spores are virtually dormant in that they do not carry on detectable metabolic activities. They do, however, survive pasteurization processes, and, at some subsequent time, can change into the vegetative-growing state and produce commercial spoilage, or, in one case, produce hazardous toxicity. Commercial or spoilage organisms are those which cause loss in quality without danger of disease or poisoning.

Thermal destruction of bacteria is a function of a time-temperature relationship, with destruction occurring in a much shorter time at high temperatures than is required when lower temperatures are employed. For example, destruction of spoilage organisms in a canned meat product might require 50 minutes or more at a temperature of 212° F. at the center of the product, whereas the same effect is achieved in only 1 minute at a center temperature of 250° F. A typical safe cook for a comminuted meat product in a 12-oz. can is 90 minutes in a retort at a temperature of 240° F. Heating at these high temperatures necessary to destroy spores results in flavor and texture deterioration and a general loss of quality in the product. Any method by which processing temperature or heating time can be safely decreased is, therefore, desirable.

It is, therefore, an object of this invention to provide an improved method for processing meat-containing canned foods in which flavor and texture deterioration is minimized.

Another object of this invention is the reduction of the thermal-processing time required for the destruction of spoilage organisms in canned foods.

Additional objects, if not specifically set forth herein, may be readily determined from the detailed description which follows.

Bacterial spores possess a substantial resistance to destruction by heat, and, as a consequence, require a prolonged processing time at a given temperature or high processing temperatures to protect canned foods containing these bacteria against spoilage. It is within the contemplation of the present invention to provide a method for increasing the heat sensitivity of these organisms and thus accomplish commercial sterilization in a shorter time or at lower temperatures than have been employed heretofore.

In general, the method of this invention comprises incorporating into a raw meat food product prior to the processing thereof a small amount of racemic alpha-aminopropionic acid, and thereafter sealing the container and subjecting the canned product to a heat-processing step. It has been found that a substantial reduction in processing time or in processing temperature is thereby afforded.

More specifically, in accordance with the method of this invention, it is possible to reduce the thermal processing necessary for the commercial canning of meat products by adding to such products a small amount of an amino acid, namely dl alanine. This form of the amino acid, which is the optically inactive form, is composed of equal parts of the dextrorotary and levorotary forms. Meat and meat-containing products are particularly well suited to the method disclosed herein. Examples of such products are cured and uncured chopped meats, luncheon meats, meat emulsions, strained meats, potted meats, ham, stew, chop suey, and chili con carne.

The amount of dl alanine which must be added to decrease thermal death time of the spoilage bacteria appears to depend to some extend upon the product being treated. Usually about 0.05% based on the weight of the product being treated is desirable, although amounts in the range around 0.1% based on the weight of the product are preferred, and as much as 0.3% based on the weight of the product has been employed. Greater amounts of the additive may be employed, but this is not particularly advantageous since the benefits realized in the use of large amounts is not commensurate with the increased amount added.

In the canning of food products considered within the scope of this invention, the meat stew or other meat containing product is prepared in the form desired, placed in a can which is then sealed, and the canned product is subjected to a processing operation. The temperature-time relationship considered necessary to impart shelf stability to a food product is conveniently referred to in $F_o$ units. $F_o$ is the sterilizing value in terms of minutes at 250° F. or lethality equivalents at other temperatures. $F_o$ values are determined by correlating specific thermal death curves with lethality values such as are set forth in The Laboratory Manual of The National Canners Association (1954). The following examples, which are given only for the purpose of illustration, show the reduction that is provided by the additive of this invention in thermal death time of spoilage bacteria in canned meat products. For making these measurements, special containers called "thermal death time cans" are usually employed.

Example I

A quantity of a raw cured mixture of comminuted beef and pork was divided into two equal portions. An aqueous solution of racemic alanine was added to one of these portions to provide a final concentration of 0.25% dl alanine based on the weight of the mixture. The additive was added as an aqueous solution in order to provide for adequate distribution throughout the product. The remaining portion, which served as a control sample, received the same amount of water as the treated batch, but no dl alanine was added. The mixture was held at room temperature for about 3 hours and then stuffed into thermal death time cans. The cans were divided into 3 groups and heated to various $F_o$ values by means of a thermal death time apparatus. After heating, all of the cans were incubated overnight at 32° C., and the contents were then aseptically sub-cultured to tryticase soy agar plates. After 72 hours incubation at 32° C. the plates were observed for the presence of bacterial growth. Sterile plates, or those showing no growth, were considered negative. Positive ratings were given to those plates in which any growth was noted.

| Sample | Bacterial Examination | | | |
|---|---|---|---|---|
| | Approximate $F_o$ | No. Cans Positive | No. Cans Negative | Percent Positive |
| A. Meat emulsion containing a small amount of added water | .005 | 6 | 4 | 60 |
| | .04 | 3 | 7 | 30 |
| | .06 | 1 | 9 | 10 |
| B. Composition A plus 0.25% dl alanine | .005 | 2 | 8 | 20 |
| | .04 | 0 | 10 | 0 |
| | .06 | 0 | 10 | 0 |

In current processing operations, it is necessary to subject a meat emulsion such as is set forth in the foregoing example to $F_o$ treatments far in excess of those employed in the example. The $F_o$ values selected were chosen to give a basis for comparison.

*Example II*

The amount of dl alanine was decreased to 0.1% based on the weight of the cured meat mixture, and the emulsion was prepared substantially in accordance with the method set forth in Example I. $F_o$ processing values were reduced to a level somewhat below those employed in the preceding example in order to obtain a better comparison. The results are tabulated below:

| Sample | Bacterial Examination | | | |
|---|---|---|---|---|
| | Approximate $F_o$ | No. Cans Positive | No. Cans Negative | Percent Positive |
| A. Meat emulsion containing a small amount of added water | .002 | 10 | 0 | 100 |
| | .02 | 7 | 3 | 70 |
| | .05 | 3 | 7 | 30 |
| B. Composition A plus 0.1% dl alanine | .002 | 9 | 1 | 90 |
| | .02 | 1 | 9 | 10 |
| | .05 | 1 | 9 | 10 |

*Example III*

A large number of bacterial spores was added to an uncured beef-pork mixture. The mixture was divided into approximately equal parts, and 0.1% dl alanine was added to one part, the other part serving as a control. Both samples were quantitatively examined within an hour for heat resistant spores (number of spores surviving a 15-minute heat treatment at 176° F.). The control material contained 100,000 heat resistant spores/gram, while the alanine-treated material contained only 900 heat resistant spores/gram. It is evident that approximately 99% of the spore inoculum had been rendered heat-sensitive by alanine.

*Example IV*

A pilot plant pack of cured meat emulsion was divided into two batches. One batch served as a control, while dl alanine was incorporated into the other batch to provide a final concentration of 0.1%. The emulsions were stuffed in 12-oz. round cans and subjected to thermal processing. Of a total of 22 control cans subjected to $F_o$ 0.075, 21 were found to contain viable aerobic spores. Of a total of 22 cans treated with dl alanine and subjected to $F_o$ 0.075, only 12 were found to contain viable aerobic spores. Thus those cans treated in accordance with this invention contained no viable aerobic spores in 46% of the samples. The control samples, on the other hand, showed no viable spores in only 5% of the test cans.

The data show that the incorporation of approximately 0.1% dl alanine to meat-containing products increases the heat sensitivity of spores of organisms of the family Bacillaceae present in the product.

Although in the preceding examples, comminuted beef-pork mixtures have been chosen as the medium in which to illustrate the benefits of this invention, the process is applicable to a wide variety of canned meat-containing materials. Comminuted beef-pork mixtures were selected because this form of the meat product is considered most difficult to sterilize because of distribution problems.

It is apparent that a significant decrease in the heating temperature and/or heating time in the retorting operation in the canning process is possible while insuring that heat sensitivity of aerobic spores is substantially increased, with only a small amount of the additive of this invention.

Obviously many modifications and variations of the invention as hereinbefore set forth may be made without departing from the spirit and scope thereof, and, therefore, only those limitations should be imposed as are indicated in the appended claims.

I claim:
1. A method for canning and processing a meat-containing food product, which comprises: incorporating in said food product a small amount of racemic alanine, confining said food product in an hermetically sealed container, and raising the temperature of said sealed container to a level sufficient to destroy spoilage organisms in said product.

2. In a canning process wherein a meat-containing food product in a closed container is subjected to a temperature sufficient to destroy spoilage bacteria, the improvement which comprises: adding a small amount of racemic alanine to said food product whereby the heat sensitivity of said bacteria is increased and the temperature required to render said product shelf stable is decreased.

3. A method for reducing the $F_o$ required to process a meat-containing food product in canning said product, which comprises: adding to said product a small amount of a mixture of dextrorotary and levorotary alpha-aminopropionic acid.

4. In the preservation of meat-containing food products containing aerobic bacterial spore flora, a method for lowering the thermal resistance of said spore flora prior to heat treatment of said food product, which comprises: incorporating in said food product a small amount, sufficient to cause said spores to become heat sensitive, of racemic alanine.

5. In a canning process wherein a meat-containing food product in a closed container is subjected to a temperature sufficient to destroy spoilage bacteria, the improvement which comprises: adding from about 0.05% to 0.3% racemic alanine to said food product whereby the heat sensitivity of said bacteria is increased and the temperature required to render said product shelf stable is decreased.

6. A process for canning a beef-pork meat product, which comprises incorporating in said product about 0.1% based on the weight of the product of dl alanine, confining said product in an hermetically-sealed container, and raising the temperature of said sealed container to a level sufficient to destroy spoilage organisms present in said container.

7. In the canning of a meat-containing product, a method for reducing the time at a given temperature necessary to destroy spoilage bacteria present in said meat-containing product, whereby to minimize flavor damage to said product, which comprises: adding to said product at least about 0.05% based on the weight of said meat-containing product of a mixture of dextro and levorotatory alanine.

References Cited in the file of this patent

UNITED STATES PATENTS

| 1,740,176 | Hormel et al. | Dec. 17, 1929 |
| 2,297,962 | Jensen et al. | Oct. 6, 1942 |
| 2,331,467 | Griffith et al. | Oct. 12, 1943 |
| 2,711,976 | Castellani | June 28, 1955 |